United States Patent Office 3,322,686
Patented May 30, 1967

3,322,686
HYDROGENATION OF CHEMICAL COMPOUNDS
AND CATALYSTS THEREFOR
Herbert C. Brown and Charles A. Brown, both of
1840 Garden St., West Lafayette, Ind. 47906
No Drawing. Filed Feb. 5, 1963, Ser. No. 256,230
8 Claims. (Cl. 252—432)

This invention relates to active nickel catalysts produced by reacting a nickel salt with a borohydride in solution in water containing a complexing agent for the nickel salt, the amount of borohydride used being not more than about one mole for each mole of nickel salt. The invention also relates to hydrogenation processes utilizing such catalysts.

It is well known that nickel can be prepared in catalytically active form by a variety of processes. A nickel catalyst known as Raney nickel is widely used in industry for the hydrogenation of olefins and polyolefins, acetylenes, unsaturated fats and oils, and similar unsaturated compounds.

The procedure for preparing Raney nickel is a relatively tedious one and is described in Organic Synthesis, coll. vol. III, 181 (1955), as follows:

"A solution of 380 g. of sodium hydroxide in 1.5 l. of distilled water contained in a 4-l. beaker equipped with an efficient stirrer, is cooled in an ice-bath to 10°, and 300 g. of nickel-aluminum alloy is added to the solution in small portions, with stirring, at such a rate that the temperature does not rise above 25°, the beaker being allowed to remain in the ice bath. When all the alloy has been added (about 2 hours is required) the stirrer is stopped, the beaker is removed from the ice bath, and the contents are allowed to come to room temperature. After the evolution of hydrogen becomes slow, the reaction mixture is allowed to stand on a steam bath until the evolution of hydrogen again becomes slow (about 8–12 hours). The heating should not be too rapid at the beginning or the solution may foam over. During this time the volume of the solution is maintained constant by adding distilled water if necessary. After heating, the nickel is allowed to settle and most of the liquid is decanted. Distilled water is then added to bring the solution to the original volume; the nickel is suspended by stirring, again allowed to settle, and the solution is decanted. The nickel is then transferred to a 2-l. beaker with the aid of distilled water and the water is again decanted. A solution of 50 g. of sodium hydroxide in 500 ml. of distilled water is added; the catalyst is suspended and allowed to settle; and the alkali is decanted. The nickel is washed by suspension in distilled water and decantation until the washings are neutral to litmus and then ten times more to remove the alkali completely (twenty to forty washings are required). The washing process is repeated three times with 200 ml. of 95% ethanol and three times with absolute ethanol; the catalyst is then stored under absolute ethanol in bottles which are completely filled with absolute ethanol and tightly closed. The product is highly pyrophoric and must be kept under a liquid at all times. The Raney nickel contained in the suspension weighs about 150 g."

It was originally observed by H. I. Schlesinger and H. C. Brown that aqueous solutions of sodium borohydride react with aqueous solutions of nickel salts to form a black solid which was alleged to be nickel boride, $Ni_2B$. This black solid was highly effective in catalyzing the hydrolysis of sodium borohydride (United States Patent No. 2,461,661 and J. Am. Chem. Soc., vol. 75, page 215).

It was later observed that this black solid was a highly effective hydrogenation catalyst with an activity in hydrogenating safrole, furfural and benzonitrile approaching that of Raney nickel (R. Paul, P. Brusson and N. Joseph, Ind. Eng. Chem., vol. 44, page 1006). The catalyst used by these authors was prepared by reacting an aqueous solution of sodium borohydride with an aqueous solution of nickel chloride hexahydrate, the borohydride and nickel salt being present in the proportion of 3 moles of borohydride to 1 mole of nickel salt. The black precipitate was collected by filtration and washed thoroughly, without exposure to air.

In the course of our investigations we prepared similar nickel catalysts by reacting an aqueous solution of nickel acetate with an aqueous solution of sodium borohydride using from about 2 to 3 moles of borohydride for each mole of nickel salt. The nickel catalyst precipitated as a granular black solid. The aqueous phase was decanted and the solid washed twice with alcohol. We discovered that these catalysts possessed unique properties. Thus, when Raney nickel is used to hydrogenate unsaturated compounds which are capable of undergoing isomerization, considerable shifting of the double bonds occurs. The use of the above nickel catalyst in hydrogenating such unsaturated compounds produces markedly less isomerization. This is illustrated in the following Table 1, showing the results obtained in hydrogenating 40 mmoles of 1-octene in 50 ml. of ethanol over 5 mmoles of Raney nickel and the results obtained in a similar hydrogenation using the above nickel catalyst.

TABLE 1.—HYDROGENATION OF 1-OCTENE

| Raney Nickel | | Nickel Boride | |
| --- | --- | --- | --- |
| Time, min. | Absorbed, Percent | Time, min. | Absorbed, Percent |
| 0 | 0 | 0 | 0 |
| 2 | 14 | 2 | 14 |
| 4 | 27 | 4 | 29 |
| 6 | 44 | 6 | 45 |
| 8 | 58 | 8 | 64 |
| 10 | 73 | 10 | 80 |
| 12 | 78 | 12 | 92 |
| 14 | 81 | 16 | 96 |
| 16 | 83 | 20 | 98 |
| 20 | 87 | | |
| 25 | 92 | | |
| 30 | 95 | | |

Table 1 shows that when using Raney nickel the hydrogenation proceeds essentially linearly until the reaction is approximately 73 percent complete and then proceeds at a greatly reduced rate. On the other hand, when the above nickel boride catalyst is used, the reaction proceeds linearly at a slightly greater rate until the recation is 92 percent complete and much less isomerization is produced. Thus, the hydrogenation of 1-octene with Raney nickel results in 27 percent isomerization of the double bond, whereas the hydrogenation with the nickel boride catalyst results in less than one-third this amount of isomerization, namely, about 8 percent.

While the nickel boride catalyst prepared as previously described by reacting sodium borohydride and the nickel salt in the proportion of 3 moles of borohydride for each mole of nickel salt in an aqueous medium produces a nickel boride catalyst possessing unique properties, the preparation of this catalyst suffers from the disadvantage of requiring 3 moles of brorohydride ion per gram atom of nickel ion. Therefore, an attempt was made to reduce the borohydride requirement to 1 mole of borohydride ion per mole of nickel ion. However, when an aqueous solution of 5.0 mmoles of nickel acetate in 25 ml. of water was treated with 5.0 mmoles of sodium borohydride in 5 ml. of water, the nickel boride was formed in a colloidal form which could not be filtered from the solution.

The present invention is based upon the discovery that if a nickel salt, such as nickel acetate, and sodium borohydride in equimolar amounts are reacted in water containing a complexing agent for the nickel salt, such as ammonia, a black granular, easily filterable precipitate is formed which exhibits good catalytic activity. This catalyst brought the hydrogenation of 1-pentene rapidly, exhibiting a half-life of 14 minutes. In the same way, nickel chloride was reduced to a granular precipitate which brought about the hydrogenation of 1-pentene, exhibiting a half-life of 13 minutes.

The half-lives for the hydrogenation at atmospheric pressure and a temperature of 25° C. of 40 mmoles of representative unsaturated compounds over 5 mmoles of catalyst, prepared by reacting equimolar amounts of a nickel salt and sodium borohydride in water containing two moles of ammonia per mole of nickel, are shown in Table 2. Except as indicated in the table, the nickel salt was nickel acetate.

TABLE 2

| Compound hydrogenated: | Half-life in minutes |
|---|---|
| 1-pentene | 14 |
| 1-pentene (NiCl$_2$) | 13 |
| 1-pentene (NiSO$_4$) | 14 |
| 1-octene | 13 |
| 1-dodecene | 12 |
| Safrole | 16 |
| Styrene | 12 |
| Cyclopentene | 15 |
| Norbornene | 12 |
| 10-undecenoic acid ethyl ester | 14 |
| 3-hexyne | 9 |
| Benzene | Very long |

The catalyst of the invention makes possible the hydrogenation of unsaturated compounds containing isomerizable olefinic double bonds with greatly reduced tendency for isomerization of the double bonds as compared with hydrogenation of such compounds using Raney nickel and other conventional catalysts. This is illustrated by Table 3 which shows the results of hydrogenation of 1-pentene separately with the catalyst of the invention and Raney nickel, samples being removed at regular intervals for analysis.

TABLE 3

| Hydrogen Absorbed in percent | 1-Pentene in percent | Cis-2-Pentene in percent | Trans-2-Pentene in percent | n-Pentane in percent |
|---|---|---|---|---|
| Raney Nickel: | | | | |
| 0 | 100 | 0 | 0 | 0 |
| 25 | 62 | 10 | 4 | 23 |
| 50 | 26 | 20 | 3 | 51 |
| 75 | 0 | 18 | 6 | 76 |
| 100 | 0 | 0 | 0 | 100 |
| Catalyst of Invention: | | | | |
| 0 | 100 | 0 | 0 | 0 |
| 25 | 72 | 2 | 1 | 25 |
| 50 | 45 | 3 | 2 | 50 |
| 75 | 18 | 4 | 3 | 75 |
| 100 | 0 | 0 | 0 | 100 |

It is frequently desired to hydrogenate a single double bond in a diene, such as 2-methyl-1,5-hexadiene. Raney nickel does hydrogenate the less substituted of the two double bonds more rapidly than the more substituted double bond, but in the process isomerization of the double bond occurs. This causes the product to be a mixture of low purity. The use of the catalyst of the invention gives an improved product.

The hydrogenation of castor oil or related esters of ricinoleic acid is important for the production of hydroxystearic acid. However, the use of conventional catalysts, such as Raney nickel, results in the loss of about 25 percent of the hydroxy groups in the course of the hydrogenation. This is due to isomerization of the double bond to place it in the allylic position relative to the hydroxyl substituent. It is well known that allyl alcohols readily undergo hydrogenolysis of the hydroxyl groups. The use of the catalyst of the invention can increase the yield of hydroxystearic acid.

The catalyst of the invention is useful for the hydrogenation of compounds containing an acetylenic triple bond. Thus, the hydrogenation of 3-hexyne proceeds to give cis-3-hexene in high purity. Attempts to hydrogenate acetylenes with conventional catalysts, such as the usual platinum or palladium catalysts, give mixtures. In the same way the catalyst of the invention can be utilized to convert 2-octyne, 2-methyl-5-decyne-2-ene, phenylmethylacetylene, diphenylacetylene, 2-butyne-1,4-diol, methylpropiolic acid ethyl ester, phenylpropiolic ethyl ester, 9-octadecynoic acid ester, the corresponding acid, amide, nitrile, aldehyde and methyl ketone and related derivatives into the corresponding cis olefin derivative. Thus, the catalyst of the invention provides a general procedure for the conversion of a triple carbon to carbon bond into an essentially pure cis carbon to carbon double bond without substantial isomerization of the latter.

The selective hydrogenation of one double bond with the catalyst of the invention is particularly useful in the hydrogenation of unsaturated fats and oils, such as soy bean oil, olive oil, tung seed oil, linseed oil, and castor oil, and of representative unsaturated fatty acids and their derivatives, such as oleic acid, linoleic acid, linolenic acid, ricinoleic acid, their esters, amides, nitriles, alcohols and aldehydes.

The catalyst of the invention is active for the hydrogenation of aromatic rings under pressure. With hydrogen at pressures of 100 to 10,000 pounds, the catalyst hydrogenates aromatics, such as benzene, toluene, o-, m-, and p-xylenes, mesitylene and other trimethylbenzenes, durene and other tetramethylbenzenes, polynuclear aromatics, such as naphthalene, phenanthrene, anthracene, and aromatic derivatives, such as phenol, cresol, naphthol, benzoic acid, and ethyl benzoate, aniline and its alkyl derivatives, pyridine and its derivatives. In this application the catalyst has a major advantage over other catalysts in being relatively insensitive to sulfur poisons and in having a long catalyst life.

The catalyst of the invention also achieves the hydrogenation of representative functional groups, such as aldehydes and ketones, lactones and esters, nitro groups, nitriles and oximes, as well as the hydrogenation of alkylthio groupings. In many cases the hydrogenation can be achieved at atmospheric pressure, although less reactive groupings are preferably hydrogenated at supra atmospheric pressures.

In the preparation of the catalyst of the invention, between 0.25 mole to 1.0 mole of borohydride per mole of nickel ion may be used but we prefer to utilize a quantity of borohydride between about 0.5 mole to about 1 mole per mole of nickel ion.

In general, we prefer to utilize two moles of the complexing agent, such as ammonia, per mole of nickel ion. However, the amount is not critical and smaller quantities, such as about one mole per mole of nickel can be used. Large quantities, such as 6 to 12 moles of ammonia per mole of nickel ion should be avoided since they lead to the formation of nickel mirrors and the yield of nickel catalyst is reduced. The ammonia can be introduced with the borohydride solution, or it may be present initially in the solution of the nickel salt. Other complexing agents can be utilized, such as methylamine, ethylamine, isopropylamine, dimethylamine, diethylamine, triethylamine, morpholine, N-methylmorpholine, ethanolamine, diethanolamine, triethanolamine, aniline, pyridine, piperidine, tartaric acid, citric acid, catechol, etc.

The sodium borohydride may be replaced by other water soluble borohydrides, such as lithium borohydride, potassium borohydride, quaternary ammonium borohydrides, magnesium borohydride, and calcium borohydride.

The invention is illustrated further by the following specific examples.

Example 1

In 50 ml. of distilled water was dissolved 5.0 mmoles of nickel acetate and placed in a 125 cc. Erlenmeyer flask with a slightly bowed bottom containing a magnetic stirring bar. The flask was flushed with nitrogen and 5.0 ml. of an aqueous solution 1.0 molar in sodium borohydride and 2.0 molar in ammonia was added with rapid stirring. After gas evolution had ceased, the flask was detached, the aqueous phase was decanted from the precipitated catalyst, and the catalyst twice washed with ethanol. The catalyst was placed in a 100 ml. Magnedash autoclave along with 200 mmoles of t-butylbenzene. The autoclave was pressured to 1800 pounds per square inch with hydrogen and the temperature raised to 125° C. The reaction was permitted to run overnight. It was complete the next morning. There was realized a 90 percent yield of t-butylcyclohexane.

Example 2

The catalyst was prepared and washed as described in Example 1. Then 50 ml. of ethanol was added to the Erlenmeyer flask and the flask attached to a hydrogen source and hydrogenation initiated by injecting 40 mmoles of 1-octene and 40 mmoles of 1-ethylcyclohexene. The hydrogenation was carried to the absorption of 40 mmoles of hydrogen. Gas chromatographic examination of the product indicated the presence of 35 mmoles of n-octane, 5 mmoles of 1-octene, 5 mmoles of ethylcyclohexane, and 35 mmoles of 1-ethylcyclohexene. Thus, the 1-octene had been selectively hydrogenated.

In our copending application Ser. No. 256,233, filed Feb. 5, 1963, now abandoned, we have described and claimed the hydrogenation of isomerizable olefins in the presence of a catalyst prepared by reacting in an aqueous medium a nickel salt and a borohydride in the molar proportion of between about 2 to 3 moles of borohydride for each mole of nickel salt.

In our copending application Ser. No. 256,232, filed Feb. 5, 1963, we have described and claimed a hydrogenation catalyst prepared by reacting in an aqueous medium a nickel salt and a borohydride in the proportion of not more than 1 mole of borohydride for each mole of nickel salt, the reaction being conducted in the presence of a support, such as activated carbon.

In our copending application Ser. No. 256,231, filed Feb. 5, 1963, we have described and claimed a hydrogenation catalyst prepared by reacting in an alcoholic medium a nickel salt and a borohydride in the proportion of not more than 1 mole of borohydride for each mole of nickel salt.

We claim:

1. The method for preparing a hydrogenation catalyst which comprises reacting a water-soluble borohydride with a water-soluble nickel salt in the proportion of about 0.25 mole to about 1 mole of borohydride for each mole of nickel salt in a liquid medium consisting essentially of water containing a complexing agent for the nickel salt in an amount not substantially more than that required to complex the nickel salt to cause precipitation of a nickel catalyst, and separating the precipitated catalyst, said borohydride being selected from the group consisting of sodium borohydride, lithium borohydride, potassium borohydride, magnesium borohydride, calcium borohydride, and a quaternary ammonium borohydride, said complexing agent being selected from the group consisting of ammonia, methylamine, ethylamine, isopropylamine, dimethylamine, diethylamine, triethylamine, morpholine, N-methylmorpholine, ethanolamine, diethanolamine, triethanolamine, aniline, pyridine, piperidine, tartaric acid, citric acid, and catechol.

2. The method as claimed by claim 1 wherein said borohydride and nickel salt are in the proportions of about 0.50 to 1 mole of borohydride for each mole of nickel salt.

3. The method as claimed by claim 1 wherein said borohydride is sodium borohydride.

4. The method as claimed by claim 2 wherein said borohydride is sodium borohydride.

5. The method as claimed by claim 3 wherein said complexing agent is ammonia.

6. The method as claimed by claim 4 wherein said complexing agent is ammonia.

7. The method as claimed by claim 5 wherein said nickel salt is nickel acetate.

8. The method as claimed by claim 6 wherein said nickel salt is nickel acetate.

References Cited

UNITED STATES PATENTS

| | | | |
|---|---|---|---|
| 2,461,661 | 2/1949 | Schlesinger et al. | 23—361 |
| 2,525,145 | 10/1950 | Mavity | 252—432 |
| 2,534,533 | 12/1950 | Schlesinger et al. | 23—361 |
| 2,708,210 | 5/1955 | Sias | 260—677 |
| 2,820,007 | 8/1957 | Biel | 260—293.2 |
| 2,892,826 | 6/1959 | Peters et al. | 252—432 X |
| 2,993,010 | 7/1961 | Guyer et al. | 252—432 |
| 3,092,613 | 6/1963 | Kennerly et al. | 252—432 X |

DANIEL E. WYMAN, *Primary Examiner.*

N. S. RIZZO, OSCAR R. VERTIZ, *Examiners.*

L. G. XIARHOS, R. PRICE, H. S. MILLER,
*Assistant Examiners.*